United States Patent
Yabe et al.

[11] Patent Number: 5,930,940
[45] Date of Patent: Aug. 3, 1999

[54] LINE INTRODUCTION GUIDE FOR PASS-THROUGH FISHING ROD

[75] Inventors: Keisuke Yabe; Hiroshi Hashimoto, both of Sakai, Japan

[73] Assignee: Shimano, Inc., Japan

[21] Appl. No.: 08/886,916

[22] Filed: Jul. 2, 1997

Related U.S. Application Data

[63] Continuation of application No. 08/520,427, Aug. 29, 1995, abandoned.

[30]  Foreign Application Priority Data

Oct. 22, 1994 [JP] Japan .................................. 6-246283

[51] Int. Cl.⁶ ..................................................... A01K 87/04
[52] U.S. Cl. ................................................ 43/24; 43/18.1
[58] Field of Search ......................................... 43/18.1, 24

[56]  References Cited

U.S. PATENT DOCUMENTS

| | | | |
|---|---|---|---|
| 2,324,429 | 7/1943 | Rondelli | 43/24 |
| 3,222,811 | 12/1965 | Henson | 43/18.1 |
| 3,432,958 | 3/1969 | Bellinger | 43/18.1 |
| 3,760,524 | 9/1973 | Butler, Jr. et al. | 43/24 |
| 3,862,509 | 1/1975 | Petersen, Jr. | 43/18.1 |
| 4,130,960 | 12/1978 | Fontenot | 43/18.1 |
| 4,156,319 | 5/1979 | Wood | 43/24 |
| 4,176,488 | 12/1979 | Ohmura | 43/24 |
| 4,183,163 | 1/1980 | Reimer | 43/18.1 |
| 4,334,379 | 6/1982 | Nelli | 43/24 |
| 4,541,197 | 9/1985 | LaRoue | 43/18.1 |
| 4,547,991 | 10/1985 | Searcy | 43/18.1 |
| 5,040,323 | 8/1991 | Hughes, Jr. | 43/18.1 |
| 5,159,776 | 11/1992 | Horton et al. | 43/24 |
| 5,181,336 | 1/1993 | Yasui | 43/24 |
| 5,299,377 | 4/1994 | Akiba | 43/18.1 |
| 5,381,619 | 1/1995 | Watkins | 43/18.1 |
| 5,406,736 | 4/1995 | Park | 43/24 |
| 5,488,797 | 2/1996 | Akiba | 43/18.1 |
| 5,491,881 | 2/1996 | Collins | 43/24 |
| 5,528,848 | 6/1996 | Myojo et al. | 43/24 |

FOREIGN PATENT DOCUMENTS

| | | | |
|---|---|---|---|
| 61-60676 | 4/1986 | Japan . | |
| 4-100377 | 8/1992 | Japan . | |
| 4-248945 | 9/1992 | Japan . | |
| 1259820 | 1/1972 | United Kingdom | 43/24 |

*Primary Examiner*—Michael J. Carone
*Assistant Examiner*—Darren Ark
*Attorney, Agent, or Firm*—Jeffer, Mangels, Butler & Marmaro LLP

[57] ABSTRACT

A line introduction guide adapted to be mounted on a pass-through fishing rod having an internal passage through which the fishing line passed, and which is used to guide the fishing line from a reel into a line introduction port of the internal passage, includes front and rear fastening elements and a connecting element. The front and rear fastening elements are formed at both ends of the guide, and are adapted to be fastened to the outer circumferential surface of the fishing rod. The connecting element connects the front and rear fastening elements, and has a guide element for guiding the fishing line from the reel into the line introduction port so that the fishing line can be passed through the internal passage of the fishing rod.

23 Claims, 8 Drawing Sheets

LINE INTRODUCTION GUIDE FOR PASS-THROUGH FISHING ROD

This application is a continuation of application Ser. No. 08/520,427, filed Aug. 29, 1995, now abandoned.

FIELD OF THE INVENTION

The present invention concerns a line introduction guide. More specifically, the present invention concerns a line introduction guide for a pass-through fishing rod which is mounted on a pass-through fishing rod having an internal passage through which the fishing line passes, and which is used to guide the fishing line from the reel into the line introduction port of said internal passage.

BACKGROUND OF THE INVENTION

Pass-through fishing rods have an internal passage for the fishing line inside the rod body, and have a line introduction port which connects said internal passage with the outside on the handle end of the rod. In such pass-through fishing rods, the fishing line from the reel is introduced into the internal passage of the rod body via the aforementioned line introduction port, and is led to an opening formed in the tip of the rod body.

When casting is performed using a spinning reel in such pass-through fishing rods, the fishing line emerges from the reel in a helical form due to the winding tendency of said line on the reel. In order to eliminate this winding tendency of the fishing line before said line is introduced into the aforementioned line introduction port, fishing rods have been proposed in which a guide is installed between the reel and the aforementioned line introduction port (as indicated in Japanese Utility Model Application Kokai No. 61-60676, etc.).

Conventional guides have a leg part which is mounted on the fishing rod, and a ring-form line passage part which is formed on the tip of said leg part. The leg part is generally formed from a wire material, and has (e.g.) an inverted V-form shape as viewed from the side. Furthermore, the ring-form line passage part is fastened to the tip of the leg part by soldering (for example). In addition, guides have also been proposed in which the leg part and line passage part are formed as an integral unit by means of a plate-form part. In this case, the leg part is fastened to the fishing rod in a single place.

In the case of conventional guides of the type described above, the aforementioned line passage part tends to catch on or strike against other parts, especially in cases where said line passage part protrudes from the rod body. As a result, said line passage part may easily become separated from the wire leg part, or said leg part may be bent. Furthermore, in cases where the leg part and line passage part are formed from a plate-form part, the line passage part is easily bent when it strikes against other parts as described above, since the leg part is fastened to the rod in a single place.

Furthermore, although the aforementioned line passage part is formed in the shape of a ring, the leg part between said line passage part and the fishing rod has an inverted "V" shape or an "I" shape. Accordingly, when so-called "line drag" occurs in the fishing line fed out from the reel, the dragging fishing line tends to become entangled with the neck part between the ring-form line passage part and the aforementioned leg part.

One object of the present invention is to improve the strength of the aforementioned guide.

Another object of the present invention is to make it more difficult for a dragging fishing line to become entangled with the guide.

Still another object of the present invention is to guide the fishing line from the reel into the line introduction port while reducing the winding tendency of said fishing line.

SUMMARY OF THE PREFERRED EMBODIMENTS

In accordance with one aspect of the present invention, there is provided an improved pass-through fishing rod line introduction guide. The line introduction guide is adapted to be mounted on a pass-through fishing rod having an internal passage with a line introduction port through which a fishing line is passed, and which is used to guide the fishing line from a reel into the line introduction port of said internal passage. This line introduction guide has front and rear fastening elements, and a connecting element. The front and rear fastening elements are formed at both ends of said guide, and are adapted to be fastened to the outer circumferential surface of the aforementioned pass-through fishing rod. The connecting element connects the aforementioned front and rear fastening elements, and has a guide element that is used to guide the fishing line from the aforementioned reel into the aforementioned line introduction port so that said fishing line can be passed through the aforementioned internal passage.

In use, the front and rear fastening elements are fastened to the fishing rod. The fishing line from the reel is led into the line introduction port of the pass-through fishing rod while being guided by the guide element formed in the connecting element which connects the aforementioned front and rear fastening elements. This line passes through the internal passage of the pass-through fishing rod, and is led out from an opening in the tip of the rod.

In such a structure, the strength of the guide is stabilized, since the guide is fastened to the fishing rod in two places, i.e., front and rear. Furthermore, since the aforementioned guide element is formed in the connecting element which connects the front and rear fastening elements, this guide element will show little bending even if the connecting element should strike against other elements. Moreover, since there is no neck element of the type found in conventional structures, there is little likelihood of the fishing line becoming caught on the guide even if line drag should occur.

According to a preferred embodiment, the aforementioned connecting element is formed as an integral unit with the aforementioned front and rear fastening elements. That is, the connecting element is unitary with the front and rear fastening elements.

As a result, manufacture is facilitated. Furthermore, since the respective elements are formed as a continuous unit, the strength of the guide can be increased, and indentations and projections can be reduced so that there is a decreased likelihood of the fishing line becoming caught on the guide.

According to a second embodiment, the aforementioned connecting element is formed in an arch shape which bends outward above the aforementioned line introduction port, and the aforementioned guide element is formed in the reel-side inclined portion of said connecting element. Thus, the arch shape has forward and rearward inclined portions, and the guide element is disposed within the rearward inclined portion.

In this embodiment, the fishing line is led into the line introduction port (positioned beneath the arch-form connecting element) while being guided by a guide element formed in the reel-side (rearward) inclined portions of said arch-form connecting element. Here, since the connecting element is formed in the shape of an arch, said connecting element protrudes smoothly from the fishing rod, so that the likelihood of the fishing line becoming caught on the connecting element is decreased. Furthermore, the strength of said connecting element is high.

According to a third preferred embodiment, said guide is further equipped with an intermediate supporting element, one end of which is fastened to the aforementioned connecting element and the other end of which is adapted to be fastened to the aforementioned pass-through fishing rod between the point of attachment of the front fastening element and the point of attachment of the rear fastening element, and which has an auxiliary guide element that guides the fishing line (which has already passed through the guide element of the aforementioned connecting element) into the aforementioned line introduction port.

In use, the fishing line is guided by the guide element of the connecting element, and is then further guided by the auxiliary guide element formed in the aforementioned intermediate supporting element before said fishing line is led into the line introduction port. Here, the fishing line can be led into the line introduction port with the winding tendency of said fishing line being reduced by means of two guide elements.

According to a fourth preferred embodiment, the guide element of the aforementioned connecting element and the auxiliary guide element of the aforementioned intermediate supporting element have respective through-holes. Particularly preferably, the through-hole of the aforementioned auxiliary guide element has a smaller diameter than the through-hole of the aforementioned guide element.

In the foregoing embodiment, the fishing line is led into the line introduction port after passing through respective through-holes of the guide element of the connecting element and the auxiliary element of the intermediate supporting element as described above. When the diameter of the through-hole of the auxiliary guide element is smaller than the diameter of the through-hole of the guide element, the fishing line, which has a winding tendency from the reel, is gradually straightened before being led into the line introduction port. Accordingly, tangling of the line is reduced.

According to a fifth preferred embodiment, the aforementioned connecting element is formed in an arch shape on the reel side of the aforementioned line introduction port. The arch shape has forward and rearward inclined portions. The aforementioned guide element is formed in the reel-side, i.e., rearward, inclined portion of said connecting element. An auxiliary guide element is further provided which is formed in forward inclined portion, i.e., the inclined portion of the aforementioned arch-form connecting element located on the line introduction port side of said connecting element.

In use, the fishing line is led into the line introduction port after being guided by the guide element formed in the reel-side inclined portion of the arch-form connecting element, and after being further guided by the auxiliary guide element formed in the inclined portion of the connecting element located on the line introduction port side of said connecting element. Here, the fishing line can be led into the line introduction port with the winding tendency of said line reduced by means of two guide elements.

According to a sixth preferred embodiment, the guide element and auxiliary guide element of the aforementioned connecting element have respective through-holes, and the through-hole of the aforementioned auxiliary guide element has a smaller diameter than the through-hole of the aforementioned guide element.

In the foregoing preferred embodiment, the fishing line can be led into the line introduction port while the winding tendency of said fishing line is gradually straightened.

According to an seventh preferred embodiment, the aforementioned connecting element has a first arch section which is formed in the shape of an arch having forward and rearward inclined portions as a continuation of the aforementioned rear fastening element, and a second arch section, also having forward and rearward inclined portions, which is formed as a continuation of the aforementioned front fastening element and first arch section, and which is formed so that it is positioned above the aforementioned line introduction port. The forward inclined portion of the first arch section and the rearward inclined portion of the second arch section join at a point which is adapted to contact the outer circumferential surface of the pass-through fishing rod. That is, the undersurface of a "valley" located between the aforementioned first arch section and second arch section is able to contact the outer circumferential surface of the pass-through fishing rod. The aforementioned guide element is formed in the rearward inclined portion, i.e., the reel-side inclined portion, of the aforementioned first arch section. The line introduction guide also has a first auxiliary guide element which is formed in the forward inclined portion of the aforementioned first arch section, i.e., the inclined portion located on the line introduction port side of said first arch section, and a second auxiliary guide element which is formed in the rearward, i.e., reel-side, inclined portion of the aforementioned second arch section.

In this embodiment, the aforementioned connecting element has two arch-form sections which form a continuous unit. After being guided by guide elements formed in both inclined portions of the reel-side arch section, the fishing line is further guided by a guide element formed in the reel-side inclined portion of the other arch section, and is then led into the line introduction port. Here, since the fishing line is guided by three guide elements, the winding tendency of said fishing line can be reduced even further before the fishing line is led into the line introduction port. Furthermore, since a "valley" formed between the two arch sections contacts the outer circumferential surface of the fishing rod, the strength of the connecting element is increased.

According to a eighth preferred embodiment, the aforementioned guide element, first auxiliary guide element and second auxiliary guide element have respective through-holes, and the diameters of said through-holes become progressively smaller toward the aforementioned line introduction port. That is, the diameter of the through-hole of the first auxiliary guide element is smaller than the diameter of the through-hole of the guide element, and the diameter of the through-hole of the second auxiliary guide element is in turn smaller than the diameter of the through-hole of the first auxiliary guide element.

In the foregoing embodiment, the winding tendency of the fishing line can be reduced even further before said fishing line is led into the line introduction port.

According to a further preferred embodiment, a line introduction guide for a pass-through fishing rod includes a cylindrical fastening element having front and rear ends and an upper surface in which is defined an opening. A connecting element having front and rear ends respectively is connected to the front and rear ends of the aforementioned cylindrical fastening element and extends over the aforementioned opening. A guide element is disposed within the aforementioned connecting element.

In accordance with another aspect of the present invention, there is provided a pass-through fishing rod comprising the inventive line introduction guide.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
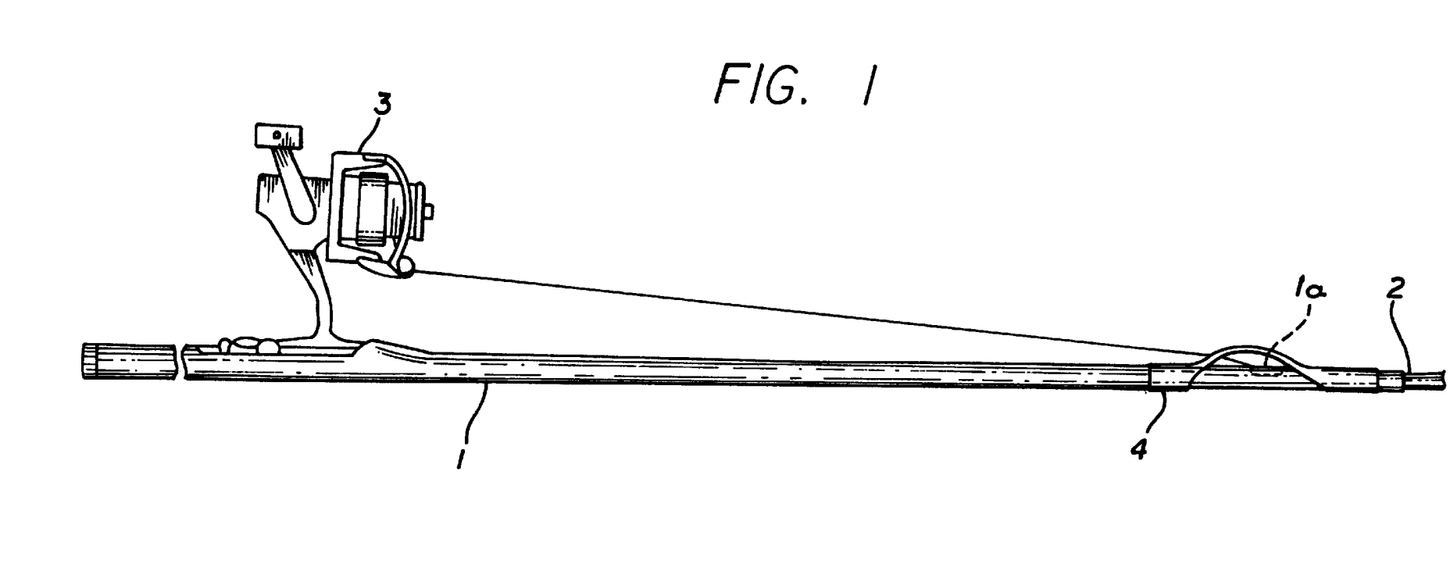
FIG. 1 is a side view of a pass-through fishing rod using one embodiment of the present invention.

With reference now to FIG. 1, a pass-through fishing rod has a cylindrical base rod (1), and a plurality of cylindrical rod bodies (2) including a tip rod body which are connected to the tip end of said base rod (1) in a shake-out configuration as is known in the art. A line introduction port (1a) is formed in the front end of the base rod (1). A fishing line, which is introduced into the interior of the rod bodies via this rod introduction port (1a), passes through an internal passage formed in the rod bodies, and is led out from an opening formed in the tip of the tip rod body. A spinning reel (3) can be mounted on the handle end of the base rod (1). Furthermore, a line introduction guide (4) of the invention is mounted on the front end of the base rod (1). Moreover, the aforementioned plurality of rod bodies (2) can be accommodated inside the base rod (1).

Figure 2A:
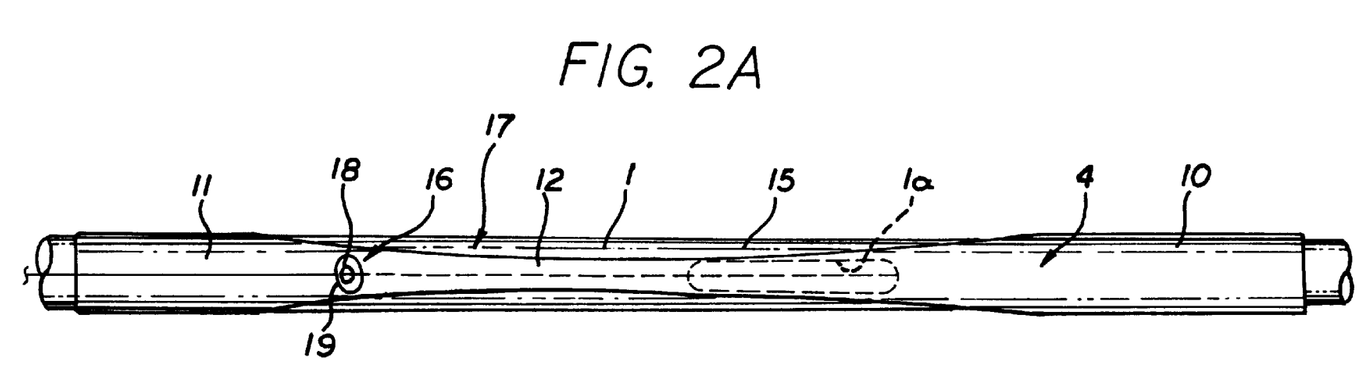
FIG. 2 shows a plan view and a side view of a line introduction guide constructed according to a first embodiment of the present invention.
Figure 2B:
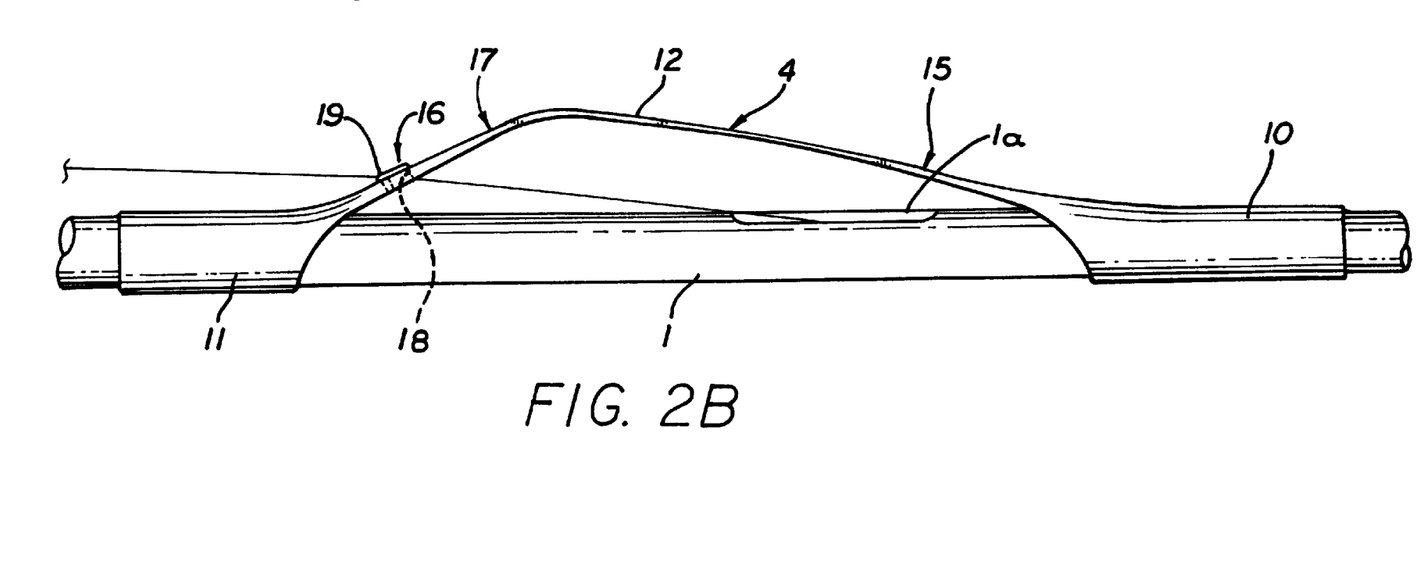
Figure 3:
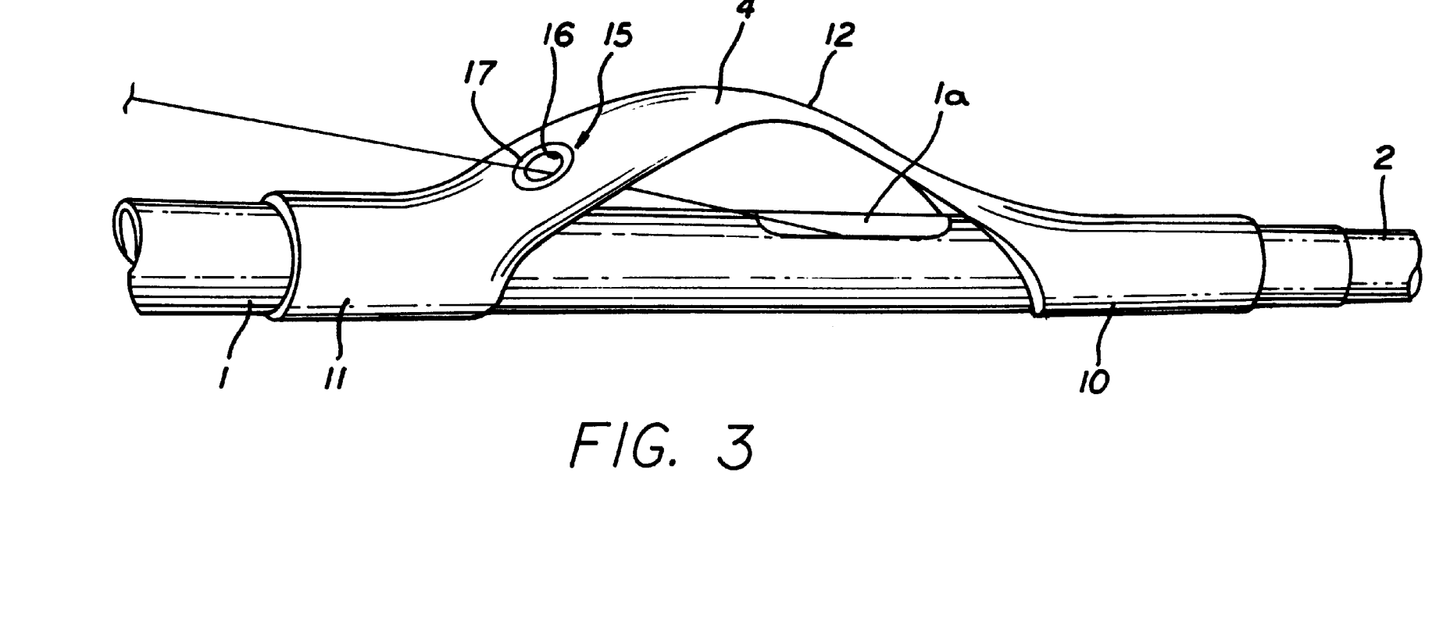
FIG. 3 is a perspective view of the line introduction guide of the aforementioned first embodiment.

As is shown in FIGS. 2 (a) and (b) and FIG. 3, the aforementioned line introduction guide (4) is a part which is formed by cutting out the intermediate portion of a pipe material (with respect to the axial direction of said pipe material) and bending said cut-out area outward. This guide (4) has a cylindrical front fastening element (10), a similarly cylindrical rear fastening element (11), and a connecting element (12) which connects said front and rear fastening elements (10) and (11). This connecting element (12) is formed in an arch shape which bends smoothly outward from the front and rear fastening elements (10) and (11). Furthermore, as is clear from FIG. 2(a), the intermediate portion of the connecting element (12) (with respect to the axial direction of said connecting element) shows a gradual narrowing in width compared to the front and rear portions of said connecting element (12). Furthermore, this line introduction guide (4) is adapted to be fastened to the base rod (1) so that the forward inclined portion (15) of the arch-form connecting element (12) is positioned above the line introduction port (1a). Moreover, a guide element (16) is formed in the reel-side (rearward) inclined portion (17) of the arch-form connecting element (12). This guide element (16) has a through-hole (18) which is formed in the connecting element (12), and a hard ring (19) comprised of a ceramic, etc., which is mounted on the rim of said through-hole (18).

In order to use this line introduction guide (4), the fishing line fed out from the reel (3) is passed through the guide element (16), and is then led into the line introduction port (1a). The fishing line which has been inserted into the interior of the rod via the line introduction port (1a) is led toward the tip rod body through an internal passage in the rod, and is led out from an opening formed in the tip of the tip rod body.

In the line introduction guide of this embodiment, the front and rear fastening elements (10) and (11) and connecting element (12) can be formed as an integral unit using a pipe material, so that manufacture is easy. Furthermore, the manufacturing process can also be simplified.

Moreover, since the guide (4) is supported on the fishing rod by the aforementioned front and rear fastening elements (10) and (11), there is little bending of the kind seen in conventional guides, even if the connecting element (12) should strike against other elements. In addition, since the connecting element (12) is formed in an arch shape so that said connection element (12) forms a smooth continuation of the front and rear fastening elements (10) and (11), the fishing line fed out from the reel will not become entangled with the connecting element (12), etc., even in cases where said fishing line drags.

Figure 4A:
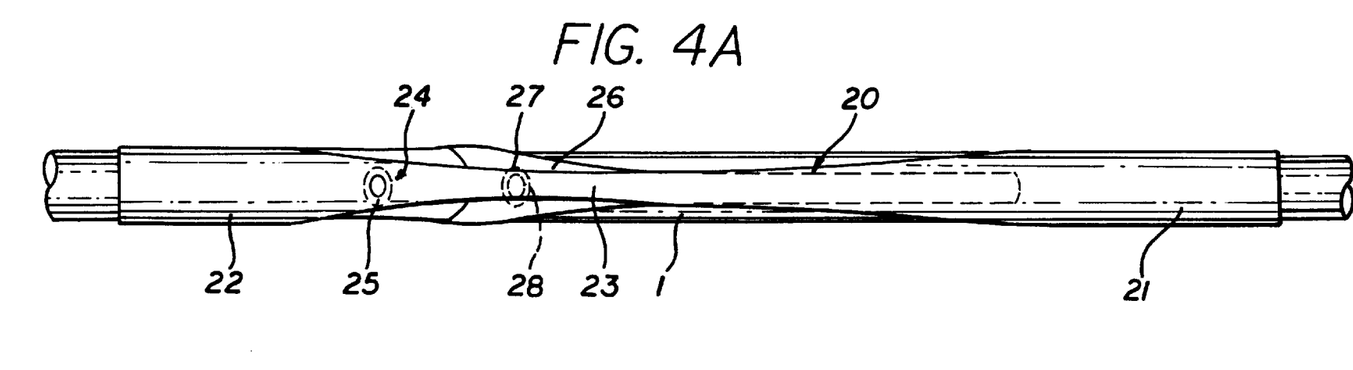
FIG. 4 corresponds to FIG. 2, and illustrates a second embodiment.
Figure 4B:
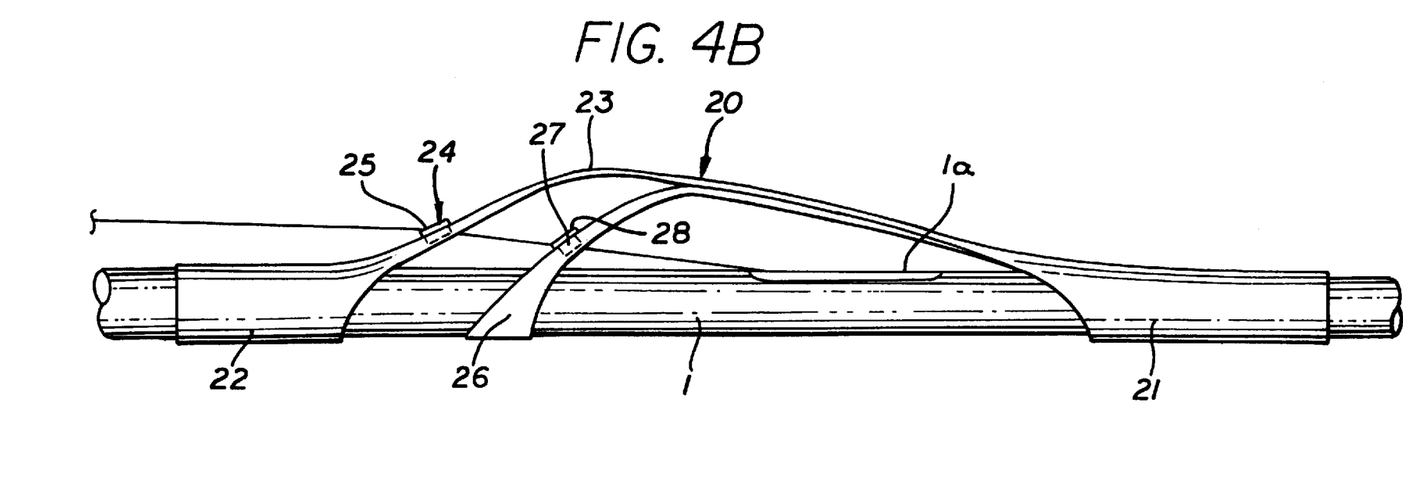

In the embodiment shown in FIG. 4, the line introduction guide (20) has front and rear fastening elements (21) and (22) and a connecting element (23) similar to those in the embodiment of FIGS. 1–3. Furthermore, a guide element (24) is formed in the rearward, reel-side inclined portion of the connecting element (23). This guide element (24) has a through-hole and a hard ring (25) which is mounted on the rim of said through-hole.

Furthermore, in this embodiment, the guide (4) also has an arch-form intermediate supporting element (26), one end of which is fastened to the connecting element (23), and the other end of which is fastened to the base rod (1). The aforementioned second end of the intermediate supporting element (26) is adapted to be fastened to an intermediate portion of the base rod (1) between the points where the front and rear fastening elements (21) and (22) are fastened. Furthermore, an auxiliary guide element (27) is formed in the reel-side inclined portion of the intermediate supporting element (26). Like the aforementioned guide element (24), this auxiliary guide element (27) has a through-hole and a hard ring (28) which is mounted on the rim of said through-hole. Here, the inside diameter of the hard ring (28) of the auxiliary guide element (27) is smaller than the inside diameter of the hard ring (25) of the guide element (24).

In this example, since an intermediate supporting element (26) is fastened to the connecting element (23), the strength of the connecting element (23) is increased. Furthermore, since the fishing line is led into the line introduction port (1a) after being passed through two guide elements (24) and (27), the winding tendency of the fishing line can be reduced before said line is led into the line introduction port (1a). Moreover, since the inside diameter of the hard ring (28) of the auxiliary guide element (27) is smaller than the inside diameter of the hard ring (25) of the guide element (24), the fishing line can be smoothly led into the line introduction port (1a) while the winding tendency of said fishing line is gradually straightened.

Figure 5:
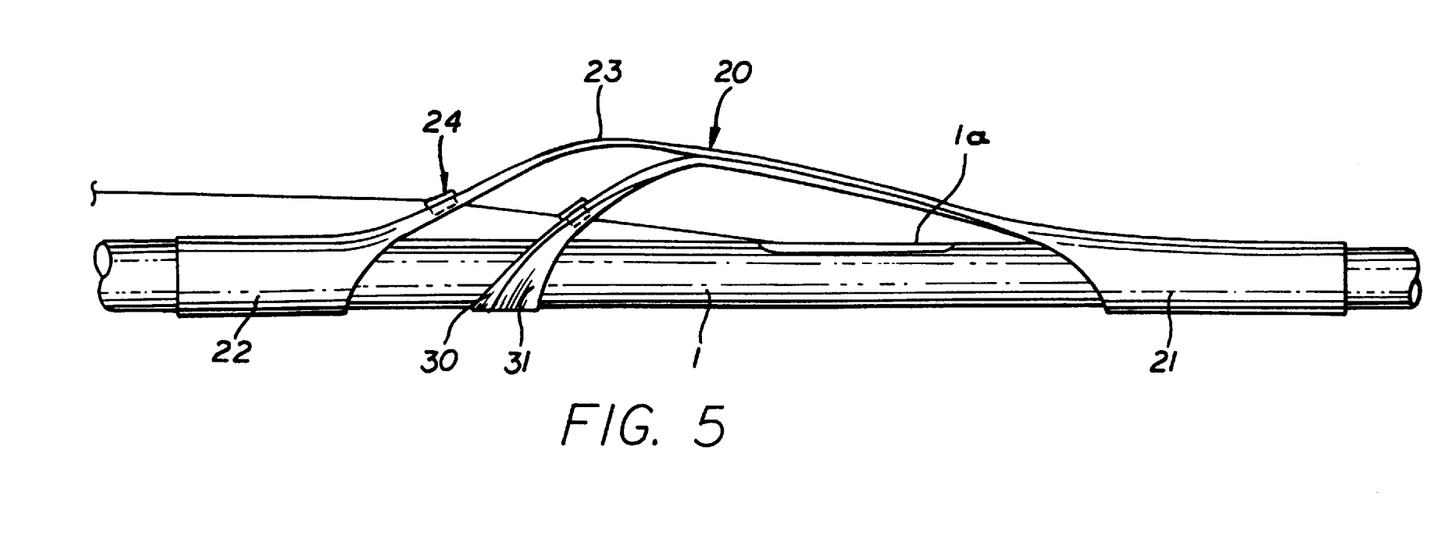
FIG. 5 illustrates a modification of the abovementioned second embodiment.

FIG. 5 illustrates a modification of the preceding embodiment.

Here, an intermediate supporting element (30) is fastened to the connecting element (23) in the same manner as described above. The shape of this intermediate supporting element (30) is more or less the same as that of the intermediate supporting element shown in FIG. 4; i.e., said intermediate supporting element (30) is formed in an arch shape, and the forward end of said intermediate supporting element (30) is fastened to the undersurface of the connecting element (23), while the other end element is adapted to be fastened to the base rod (1). Furthermore, a resin (31) is attached to the lower surface (undersurface) of the rearward, reel-side inclined portion of the intermediate supporting element (30). Accordingly, even in cases where the angler manipulates the fishing rod by inserting his or her fingers into the space between the intermediate supporting element (30) and the base rod (1), scratching caused by direct contact of the fingers with the edges, etc., of the supporting element (30) can be prevented.

Figure 6A:
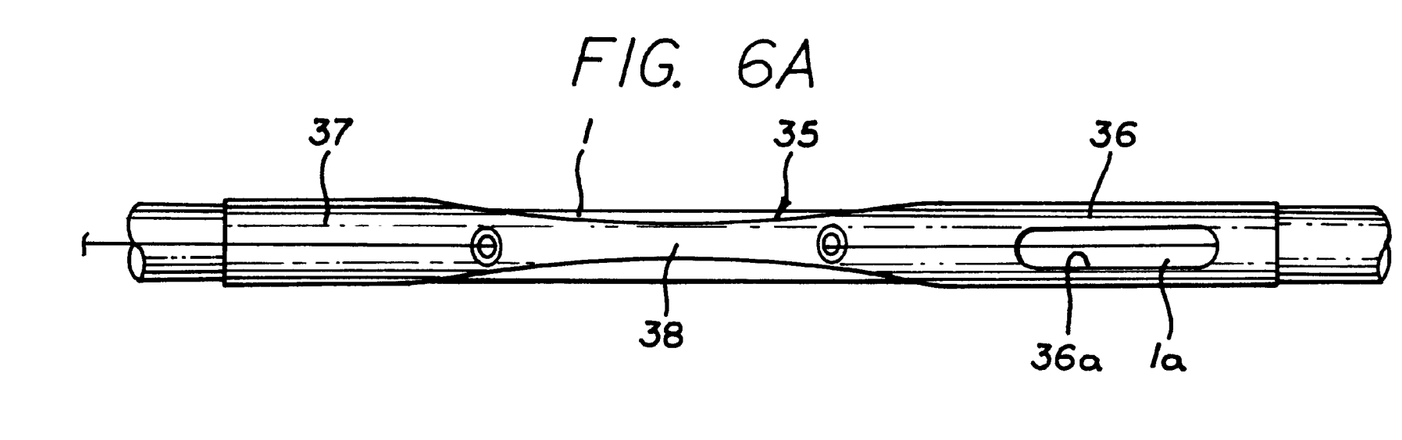
FIG. 6 corresponds to FIG. 2, and illustrates a third embodiment.
Figure 6B:
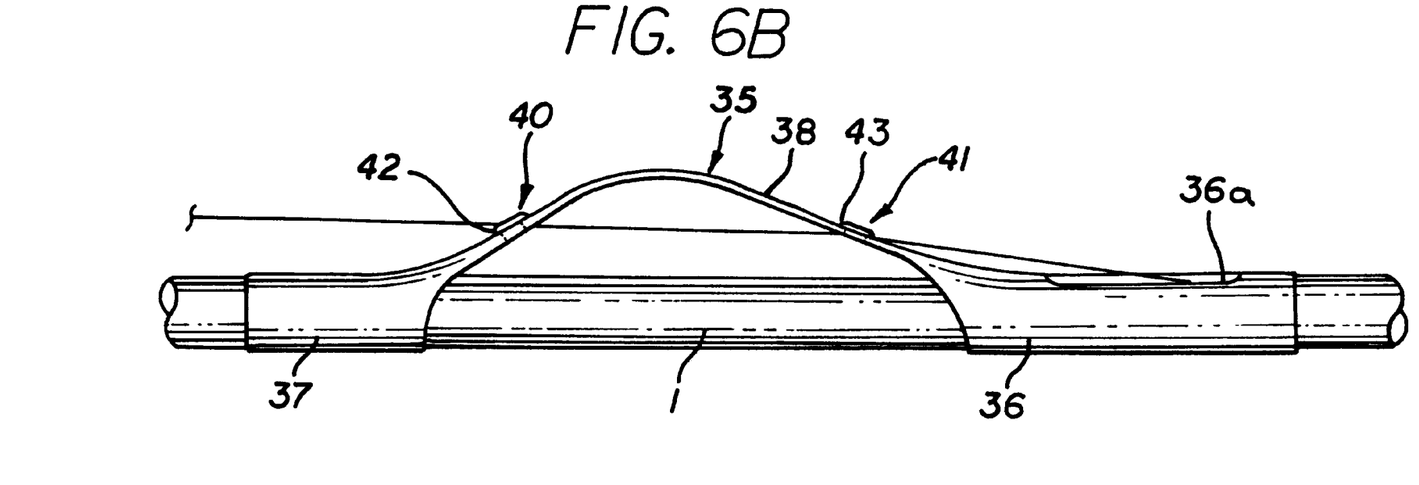

In FIG. 6, the line insertion guide (35) is formed as an integral unit using a pipe material in the same manner as described above. This guide (35) has a cylindrical front fastening element (36) and rear fastening element (37), and a connecting element (38) which connects said front and rear fastening elements (36) and (37). The connecting element (38) is bent smoothly outward into an arch shape from the front and rear fastening elements (36) and (37), and the intermediate portion of said connecting element (38) (with respect to the axial direction of said connecting element) is narrower than the other portions.

Furthermore, the line introduction guide (35) of this embodiment is adapted to be mounted on the base rod (1) so that the arch-form connecting element (38) is positioned further to the rear than the line introduction port (1a). An opening (36a) which has the same dimensions as the line introduction port (1a) or which is larger than said line introduction port (1a) is formed in the front fastening element (36), and the respective elements are positioned so that this opening (36a) is superimposed on the line introduction port (1a).

A guide element (40) is formed in the rearward, reel-side inclined portion of the arch-form connecting element (38), and an auxiliary guide element (41) is formed in the inclined portion on the line introduction port side (forward side) of said connecting element (38). The guide element (40) has a through-hole and a hard ring (42) which is mounted on the rim of said through-hole. Furthermore, the auxiliary guide element (41) similarly has a through hole and a hard ring (43) which is mounted on the rim of said through-hole, and the inside diameter of the hard ring (43) of the auxiliary guide element (41) is smaller than the inside diameter of the hard ring (42) of the guide element (40).

In this embodiment, two guide elements can be formed by means of a simple structure similar to that of the embodiment illustrated in FIG. 1. As a result, the winding tendency of the fishing line can be further reduced, so that the fishing line can be smoothly led into the line introduction port (1a).

Figure 7A:
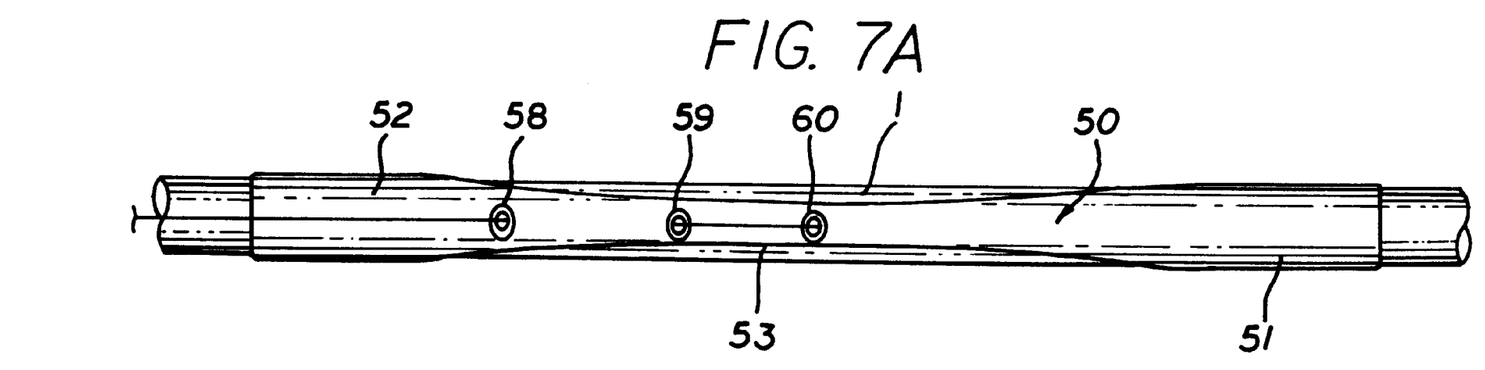
FIG. 7 corresponds to FIG. 2, and illustrates a fourth embodiment.
Figure 7B:
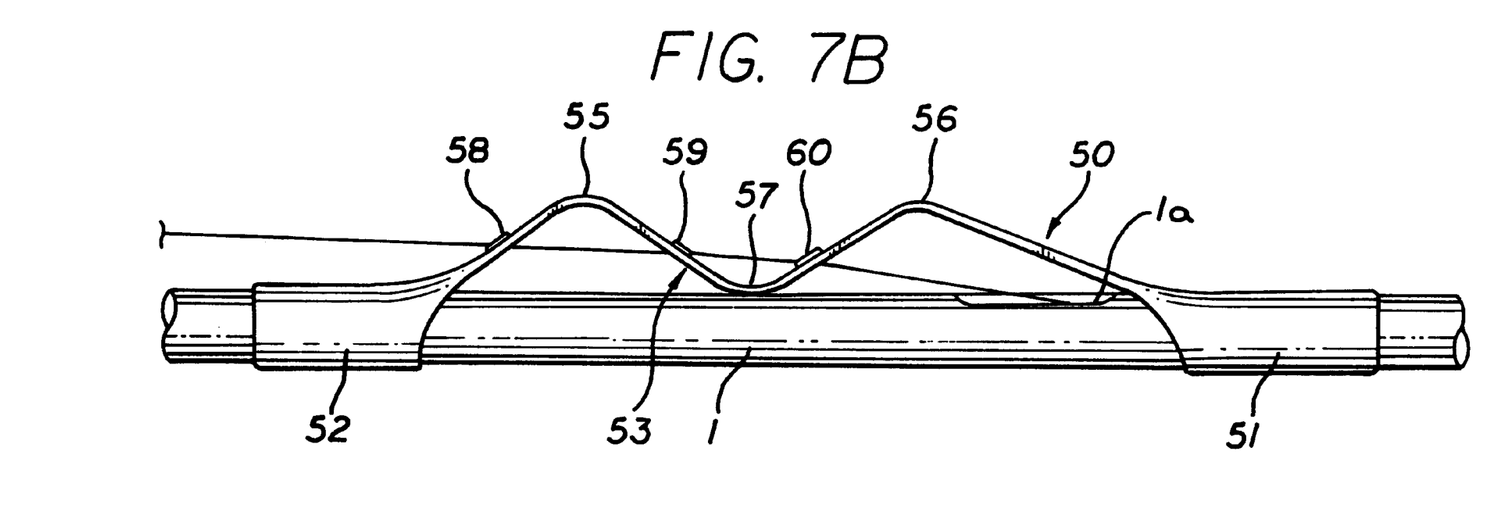

In the alternative embodiment of FIG. 7, the line introduction guide (50) has a cylindrical front fastening element (51) and rear fastening element (52), and a connecting element (53) which connects said fastening elements (51) and (52). These respective elements (51), (52) and (53) are formed as an integral unit using a pipe material.

The connecting element (53) has a first arch section, or bridge part (55) which is formed in the shape of an arch as a continuation of the rear fastening 30 element (52), and a second arch section, or bridge part (56) which is formed as a continuation of the front fastening element (51) and first arch section (55), and which is formed so that it is positioned above the line introduction port (1a). The undersurface of the "valley" (57) located between the first arch section (55) and second arch section (56), i.e., the point at which the first and second arch sections join, is adapted to contact the outer circumferential surface of the base rod (1), and preferably is fastened to said base rod (1). Furthermore, respective guide elements (58), (59) and (60) are formed in the rearward, reel-side inclined portion and forward-side inclined portion of the first arch section (55), and in the rearward, reel-side inclined portion of the second arch section (56). In the same manner as described above, the respective guide elements (58), (59) and (60) each have a through-hole and a hard ring mounted on the rim of said throughhole. Moreover, the inside diameters of the hard rings of the respective guide elements (58), (59) and (60) preferably grow smaller in the direction of the line introduction port (1a).

Here, since the connecting element (53) is constructed from two arch sections (55) and (56), and since the "valley" (57) between said arch sections can be fastened to the outer circumferential surface of the base rod (1), the strength of the guide is increased compared to that of the aforementioned first embodiment. Furthermore, since the fishing line is guided by three guide elements, said fishing line can be smoothly led into the line introduction port (1a). In addition, since the inside diameters of the hard rings of the three guide elements preferably decrease in the direction of the line introduction port (1a), the winding tendency of the fishing line can be more completely eliminated.

Figure 8:
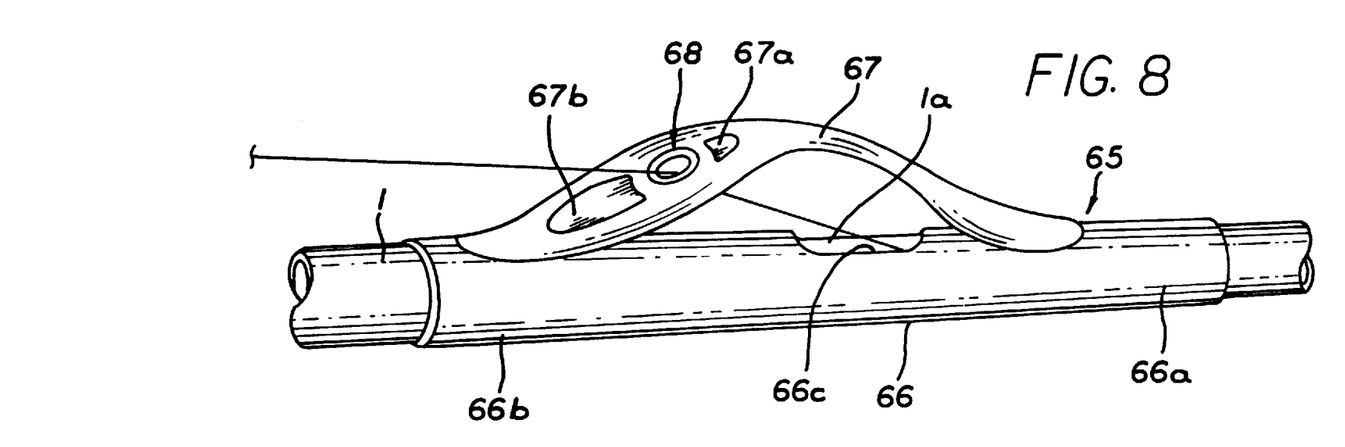
FIG. 8 is a perspective view of a fifth embodiment.

In the embodiment shown in FIG. 8, the line introduction guide (65) of this embodiment, the front and rear fastening elements are formed by a single body. Specifically, this line introduction guide (65) has a cylindrical fastening member (66), and an arch-form connecting element (67) which is affixed, e.g., soldered, to said fastening member (66). The front element of the fastening member (66) functions as a front fastening element (66a), and the rear element of said fastening member (66) functions as a rear fastening element (66b). Furthermore, an opening (66c) which has the same dimensions as the line introduction port (1a) formed in the base rod (1), or which is larger than said line introduction port (1a), is formed in the upper surface of the fastening member (66). The connecting element (67) is fastened to the fastening member (66) so that the forward inclined portion of said connecting element (67) is positioned above the opening (66c). Furthermore, a guide element (68) is formed in the reel-side inclined portion of the connecting element (67). As in the previously described embodiments, this guide element (68) has a through-hole and a hard ring which is mounted on the rim of said through-hole. Moreover, openings (67a) and (67b) are formed in the reel-side inclined portion of the connecting element (67) above and below the guide element (68), so that the weight of the connecting element (67) is reduced.

In the respective embodiments described above, the front and rear fastening elements were formed as pipe-form elements; however, the shape of the front and rear fastening elements is not limited to the shapes shown in the above-mentioned embodiments.

Figure 9:
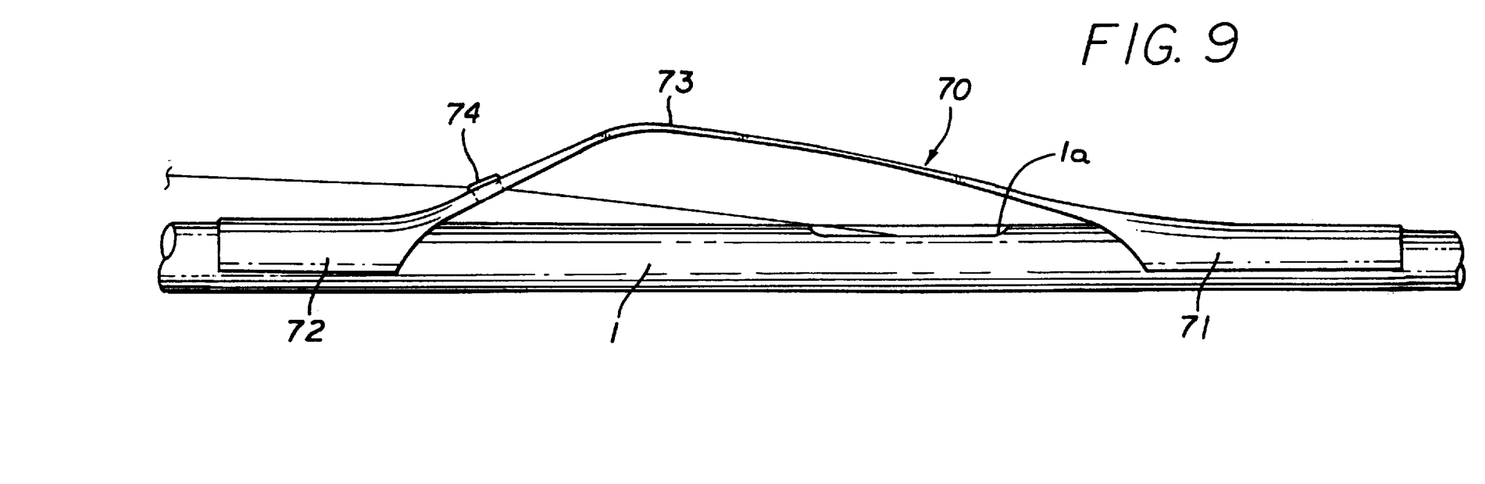
FIG. 9 is a side view of a line introduction guide illustrating a modification of the previously described embodiments.

The basic structure of the line introduction guide (70) illustrated in FIG. 9 is similar to that of the respective embodiments described above. This guide (70) consists of front and rear fastening elements (71) and (72), and an arch-form connecting element (73) which connects said fastening elements. Furthermore, a guide element (74) is formed in the reel-side inclined portion of the connecting element (73). In this example, the front and rear fastening elements (71) and (72) are not completely cylindrical, but instead have a circular arc shape. In the case of such a structure, assembly can be performed from above the fishing rod, so that assembly work is facilitated.

What is claimed is:

1. A line introduction guide for a pass through fishing rod comprising:

(a) a cylindrical fastening element having a longitudinal axis, front and rear ends and an upper surface in which is defined an opening for a fishing line, (b) a connecting element having front and rear ends respectively connected to said front and rear ends of said cylindrical fastening element, said connecting element extending over said opening in said upper surface and extending above said fastening element, thereby defining an opening between said connecting element and said fastening element which is open in a direction non-parallel to said longitudinal axis, and (c) a guide element disposed within said connecting element for guiding a fishing line from a reel through said connecting element and into said opening in said upper surface of said cylindrical fastening element.

2. The line introduction guide of claim 1 wherein said connecting element is formed in an arch shape having forward and rearward inclined portions, and wherein said guide element is disposed within said rearward inclined portion.

3. A line introduction guide for a pass-through fishing rod having a line introduction port, said line introduction guide comprising:

(a) separate front and rear fastening elements which define a longitudinal axis and are adapted to engage an outer circumferential surface of a pass-through fishing rod such that said line introduction port is located between said front and rear fastening elements, (b) a connecting element joining said front and rear fastening elements, said connecting element extending above said front and rear fastening element and said outer circumferential surface of said pass-through fishing rod when said line introduction guide is fastened to said outer circumferential surface, thereby defining an opening between said connecting element and said surface which is non-parallel to said longitudinal axis, and (c) a guide element disposed within said connecting element for guiding a fishing line from a reel through said connecting element and between said separate front and rear fastening elements into said line introduction port so that said fishing line can be passed through an internal passage of said pass-through fishing rod.

4. The line introduction guide of claim 3 wherein said connecting element comprises first and second arch sections having respective forward and rearward inclined portions, the forward inclined section of said first arch section and the rearward inclined section of said second arch sections joining at a point which is capable of contacting the outer circumferential surface of said pass-through fishing rod, said guide element is formed in the rearward inclined portion of said first arch section, and said line introduction guide further comprises a first auxiliary guide element which is formed in said forward inclined portion of said first arch section and a second auxiliary guide element which is formed in said rearward inclined portion of said second arch section.

5. A line introduction guide for a passthrough fishing rod which is adapted to be mounted on a pass-through fishing rod having an outer circumferential surface and an internal passage with a line introduction port through which a fishing line is passed, and to guide said fishing line from a reel into said line introduction port of said internal passage, said line introduction guide having front and rear ends, said line introduction guide comprising:

(a) separate front and rear fastening elements which define a longitudinal axis and which are respectively formed at said front and rear ends of said guide, and which are adapted to be fastened to said outer circumferential surface of said pass-through fishing rod, such that said line introduction port is located between said front and rear fastening elements, (b) a connecting element which connects said front and rear fastening elements, said connecting element extending above said front and rear fastening elements and said outer circumferential surface of said pass-through fishing rod when said line introduction guide is fastened to said outer circumferential surface, thereby defining an opening between said connecting element and said surface which is open in a direction non-parallel to said longitudinal axis, and disposed in said connecting element (c) a guide element for guiding a fishing line from a reel through said connecting element and between said separate front and rear fastening elements into said line introduction port of said pass-through fishing rod so that said fishing line can be passed through said internal passage of said pass-through fishing rod.

6. The line introduction guide of claim 5 wherein said connecting element is unitary with said front and rear fastening elements.

7. The line introduction guide of claim 5 wherein said front and rear fastening elements are cylindrical elements adapted to surround and engage a portion of said outer circumferential surface of said pass-through fishing rod.

8. The line introduction guide of claim 5 wherein said connecting element is formed in an arch shape having forward and rearward inclined portions, and wherein said guide element is disposed within said rearward inclined portion.

9. The line introduction guide of claim 8 wherein said forward and rearward inclined portions have different lengths.

10. The line introduction guide of claim 8 wherein said connecting element narrows between said front and rear fastening elements.

11. The line introduction guide of claim 5 wherein said guide element is a ring affixed within said connecting element.

12. The line introduction guide of claim 5 wherein said front and rear fastening elements have circular arc cross-sections.

13. The line introduction guide of claim 5 further comprising
   (d) an intermediate supporting element having a first end affixed to said connecting element and a second end connected to an intermediate fastening element which is disposed between said front and rear fastening elements, and disposed therein
   (e) an auxiliary guide element for guiding said fishing line to said line introduction port.

14. The line introduction guide of claim 13 wherein said guide element and said auxiliary guide element are affixed within said connecting element and said intermediate supporting element, respectively.

15. The line introduction guide of claim 14 wherein said guide element and said auxiliary guide element have respective through-holes, and the through-hole of said auxiliary guide element has a smaller diameter than the through-hole of said guide element.

16. The line introduction guide of claim 15 wherein said guide element and said auxiliary guide elements are rings.

17. The line introduction guide of claim 13 wherein said intermediate supporting element has a lower surface which is at least partially coated with a resin.

18. A pass-through fishing rod comprising
   (a) a rod body having a base, a line introduction port, an internal passage, a tip and an opening defined in said tip,
   (b) a reel affixed to said base,
   (c) a fishing line, and
   (d) the line introduction guide of claim 13,
   wherein said line introduction guide is affixed to said rod body such that said intermediate supporting element extends above said line introduction port and said fishing line passes through said guide element, said auxiliary guide element and said line introduction port into said internal passage.

19. The line introduction guide of claim 5 wherein said connecting element comprises (i) a first arch section which is formed in the shape of an arch having forward and rearward inclined portions as a continuation of said rear fastening element and (ii) a second arch section having forward and rearward inclined portions which is formed as a continuation of said front fastening element and said first arch section, said forward inclined portion of said first arch section and said rearward inclined section of said second arch sections joining at a point which is capable of contacting the outer circumferential surface of said pass-through fishing rod,
   said guide element is formed in the rearward inclined portion of said first arch section,
   and said line introduction guide further comprises a first auxiliary guide element which is formed in said forward inclined portion of said first arch section and a second auxiliary guide element which is formed in said rearward inclined portion of said second arch section.

20. The line introduction guide of claim 19 wherein said guide element, first auxiliary guide element and second auxiliary guide element have respective through-holes, the through-hole of said first auxiliary guide element has a smaller diameter than the through-hole of said guide element, and the through-hole of said second auxiliary guide element has a smaller diameter than the through-hole of said first auxiliary guide element.

21. A pass-through fishing rod comprising
   (a) a rod body having a base, a line introduction port, an internal passage, a tip and an opening defined in said tip,
   (b) a reel affixed to said base,
   (c) a fishing line, and
   (d) the line introduction guide of claim 19,
   wherein said line introduction guide is affixed to said rod body such that said second arch section extends above said line introduction port and said fishing line passes through said guide element, said first and second auxiliary guide elements and said line introduction port into said internal passage.

22. A pass-through fishing rod comprising:
   (a) a rod body having an outer circumferential surface, a base, a line introduction port, an internal passage, a tip and an opening defined in said tip,
   (b) a reel affixed to said base,
   (c) a fishing line, and
   (d) a line introduction guide having front and rear ends, said line introduction guide comprising
      (i) separate front and rear fastening elements which define a longitudinal axis and which are respectively formed at said front and rear ends of said guide, and which are adapted to be fastened to said outer circumferential surface of said rod body such that said line introduction port is located between said front and rear fastening elements,
      (ii) a connecting element which connects said front and rear fastening elements, said connecting element extending above said front and rear fastening elements and said outer circumferential surface of said pass-through fishing rod when said line introduction guide is fastened to said outer circumferential surface, thereby defining an opening between said connecting element and said surface which is open in a direction non-parallel to said longitudinal axis, and disposed in said connecting element
      (iii) a guide element for guiding said fishing line from said reel through said connecting element and between said separate front and rear fastening elements into said line introduction port of said pass-through fishing rod,
   wherein said line introduction guide is affixed to said rod body such that said connecting element extends above said line introduction port and said fishing line passes through said guide element and said line introduction port into said internal passage.

23. A pass-through fishing rod comprising:
   (a) a rod body having an outer circumferential surface, a base, a line introduction port, an internal passage, a tip and an opening defined in said tip,
   (b) a reel affixed to said base,
   (c) a fishing line, and
   (d) a line introduction guide comprising
      (i) a cylindrical fastening element having a longitudinal axis, front and rear ends and an upper surface in which is defined an opening for said fishing line,
      (ii) a connecting element having front and rear ends respectively connected to said front and rear ends of said cylindrical fastening element, said connecting element extending over said opening in said upper surface and extending above said fastening element, thereby defining an opening between said connecting element and said fastening element which is open in a direction non-parallel to said longitudinal axis, and (iii) a guide element disposed within said connecting element for guiding said fishing line from said reel through said connecting element and into said opening in said upper surface of said cylindrical fastening element, wherein said line introduction guide is affixed to said rod body such that said opening in said fastening element is aligned with said line introduction port and said fishing line passes through said guide element, said opening in said upper surface of said cylindrical fastening element and said line introduction port into said internal passage.

* * * * *

(12) EX PARTE REEXAMINATION CERTIFICATE (5366th)
United States Patent
Yabe et al.

(10) Number: US 5,930,940 C1
(45) Certificate Issued: May 9, 2006

(54) LINE INTRODUCTION GUIDE FOR PASS-THROUGH FISHING ROD

(75) Inventors: Keisuke Yabe, Sakai (JP); Hiroshi Hashimoto, Sakai (JP)

(73) Assignee: Shimano Inc., Sakai (JP)

Reexamination Request:
No. 90/006,173, Dec. 20, 2001

Reexamination Certificate for:
Patent No.: 5,930,940
Issued: Aug. 3, 1999
Appl. No.: 08/886,916
Filed: Jul. 2, 1997

Related U.S. Application Data

(63) Continuation of application No. 08/520,427, filed on Aug. 29, 1995, now abandoned.

(30) Foreign Application Priority Data

Oct. 12, 1994 (JP) .............................................. 6-246283

(51) Int. Cl.
*A01K 87/04* (2006.01)

(52) U.S. Cl. .................... 43/24; 43/18.1 R; 43/18.1 HR
(58) Field of Classification Search .................. 43/18.1, 43/24
See application file for complete search history.

(56) References Cited

U.S. PATENT DOCUMENTS 5,181,336 A * 1/1993 Yasui ............................ 43/24

FOREIGN PATENT DOCUMENTS

GB          2112612          7/1983

* cited by examiner

*Primary Examiner*—Kurt Rowan (57) ABSTRACT

A line introduction guide adapted to be mounted on a pass-through fishing rod having an internal passage through which the fishing line passed, and which is used to guide the fishing line from a reel into a line introduction port of the internal passage, includes front and rear fastening elements and a connecting element. The front and rear fastening elements are formed at both ends of the guide, and are adapted to be fastened to the outer circumferential surface of the fishing rod. The connecting element connects the front and rear fastening elements, and has a guide element for guiding the fishing line from the reel into the line introduction port so that the fishing line can be passed through the internal passage of the fishing rod.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 4 and 6–23 is confirmed.

Claims 1, 3 and 5 are cancelled.

New claim 24 is added and determined to be patentable.

*24. A line introduction guide for a pass-through fishing rod having a line introduction port, said line introduction guide comprising:*

*(a) separate front and rear fastening elements which define a longitudinal axis and are adapted to engage an outer circumferential surface of a pass-through fishing rod such that said line introduction port is located between said front and rear fastening elements,*

*(b) a connecting element joining said front and rear fastening elements, said connecting element extending above said front and rear fastening element and said outer circumferential surface of said pass-through fishing rod when said line introduction guide is fastened to said outer circumferential surface, thereby defining an opening between said connecting element and said surface which is non-parallel to said longitudinal axis, wherein said connecting element is unitary with said front and rear fastening elements, and*

*(c) a guide element disposed within said connecting element for guiding a fishing line from a reel through said connecting element and between said separate front and rear fastening elements into said line introduction port so that said fishing line can be passed through an internal passage of said pass-through fishing rod.*

\* \* \* \* \*